United States Patent
Fujishiro (10) Patent No.: US 9,961,623 B2
(45) Date of Patent: May 1, 2018

(54) COMMUNICATION CONTROL METHOD, USER TERMINAL, AND BASE STATION

(71) Applicant: KYOCERA CORPORATION, Kyoto (JP)

(72) Inventor: Masato Fujishiro, Yokohama (JP)

(73) Assignee: KYOCERA Corporation, Kyoto (JP)

(*) Notice: Subject to any disclaimer, the term of this patent is extended or adjusted under 35 U.S.C. 154(b) by 56 days.

(21) Appl. No.: 15/024,708

(22) PCT Filed: Sep. 24, 2014

(86) PCT No.: PCT/JP2014/075318
§ 371 (c)(1),
(2) Date: Mar. 24, 2016

(87) PCT Pub. No.: WO2015/046267
PCT Pub. Date: Apr. 2, 2015

(65) Prior Publication Data
US 2016/0249285 A1 Aug. 25, 2016

(30) Foreign Application Priority Data

Sep. 27, 2013 (JP) ................... 2013-202768

(51) Int. Cl.
*H04W 48/18* (2009.01)
*H04W 48/08* (2009.01)
*H04W 84/12* (2009.01)
*H04W 88/06* (2009.01)

(52) U.S. Cl.
CPC ........... *H04W 48/18* (2013.01); *H04W 48/08* (2013.01); *H04W 84/12* (2013.01); *H04W 88/06* (2013.01)

(58) Field of Classification Search
CPC .......................... H04M 3/42314; H04W 84/16
See application file for complete search history.

(56) References Cited

U.S. PATENT DOCUMENTS

| 2007/0224988 | A1 | 9/2007 | Shaheen |
| 2013/0073710 | A1 | 3/2013 | Lee |
| 2014/0233465 | A1 | 8/2014 | Aramoto et al. |
| 2015/0341855 | A1* | 11/2015 | Bergman ............ H04W 48/18 370/329 |

FOREIGN PATENT DOCUMENTS

| JP | 2009-531972 A | 9/2009 |
| JP | 2013-074453 A | 4/2013 |

OTHER PUBLICATIONS

International Search Report issued in PCT/JP2014/075318; dated Dec. 9, 2014.

(Continued)

*Primary Examiner* — Chandrahas B Patel
(74) *Attorney, Agent, or Firm* — Studebaker & Brackett PC (57) ABSTRACT

A communication control is used in a communication system capable of using a plurality of network selection schemes for selecting, from a cellular RAN and a wireless LAN, an access network in which traffic of UE 100 is to be accommodated. The communication control method includes a step of receiving, from the cellular RAN by UE 100 existing in a cell included in the cellular RAN, a network selection configuration related to a network selection scheme decided by the cellular RAN from among the plurality of network selection schemes.

4 Claims, 9 Drawing Sheets

(56) References Cited

OTHER PUBLICATIONS

Written Opinion issued in PCT/JP2014/075318; dated Dec. 9, 2014.
3rd Generation Partnership Project; Technical Specification Group Radio Access Network; Study on WLAN/3GPP Radio Interworking; 3GPP TR 37.834; V1.0.0; Aug. 2013; pp. 1-14; Release 12; 3GPP Organizational Partners.

* cited by examiner

COMMUNICATION CONTROL METHOD, USER TERMINAL, AND BASE STATION

TECHNICAL FIELD

The present invention relates to a communication control method, a user terminal, and a base station that are used in a cellular communication system capable of cooperating with a wireless local area network (LAN) system.

BACKGROUND ART

Recently, user terminals having cellular communication and wireless local area network (LAN) communication (so-called dual terminals) have become widespread. In addition, the number of wireless LAN access points managed by an operator of a cellular communication system is on the rise.

Thus, in the 3rd Generation Partnership Project (3GPP), which is a standardization project for a cellular communication system, there has been considered a technique that can strengthen cooperation between a cellular radio access network (RAN) and a wireless LAN.

For example, by switching a network so that the traffic of a user terminal that is accommodated in a cellular RAN is accommodated in a wireless LAN, the traffic load on the cellular RAN can be reduced (off-load).

In addition, as a network selection scheme for selecting, from the cellular RAN and the wireless LAN, an access network in which the traffic of a user terminal is accommodated, a plurality of network selection schemes is proposed (refer to Non Patent Literature 1).

CITATION LIST

Non Patent Literature

Non Patent Literature 1: 3GPP Technical Report "TR 37.834 V1.0.0" August 2013

SUMMARY OF INVENTION

The plurality of currently-proposed network selection schemes, however, each has advantages and disadvantages. It is therefore not preferable from the aspect of improvement in network selection to perform an operation using only any one network selection scheme in a fixed manner.

Thus, an object of the present invention is to provide a communication control method, a user terminal, and a base station that enable network selection schemes to be appropriately used according to each case.

A communication control method according to a first aspect is used in a communication system capable of using a plurality of network selection schemes for selecting, from a cellular RAN and a wireless LAN, an access network in which traffic of a user terminal is to be accommodated. The communication control method includes a step of receiving, from the cellular RAN by a user terminal existing in a cell included in the cellular RAN, a network selection configuration related to a network selection scheme decided by the cellular RAN from among the plurality of network selection schemes.

A user terminal according to a second aspect exists in a cell included in a cellular RAN in a communication system capable of using a plurality of network selection schemes for selecting, from the cellular RAN and a wireless LAN, an access network in which traffic of the user terminal is to be accommodated. The user terminal includes a receiver configured to receive, from the cellular RAN, a network selection configuration related to a network selection scheme decided by the cellular RAN from among the plurality of network selection schemes.

A base station according to a third aspect constructs a cellular RAN in a communication system capable of using a plurality of network selection schemes for selecting, from the cellular RAN and a wireless LAN, an access network in which traffic of a user terminal is to be accommodated. The base station transmits, to a user terminal existing in an own cell, a network selection configuration related to a network selection scheme to be applied in an own cell from among the plurality of network selection schemes.

DESCRIPTION OF EMBODIMENTS

Overview of Embodiments

A communication control method according to first to third embodiments is used in a communication system capable of using a plurality of network selection schemes for selecting, from a cellular RAN and a wireless LAN, an access network in which traffic of a user terminal is to be accommodated. The communication control method includes a step of receiving, from the cellular RAN by a user terminal existing in a cell included in the cellular RAN, a network selection configuration related to a network selection scheme decided by the cellular RAN from among the plurality of network selection schemes.

In the first to third embodiments, the network selection configuration includes information for specifying the network selection scheme decided by the cellular RAN, and network selection parameter corresponding to the network selection scheme decided by the cellular RAN.

In the first to third embodiments, the communication control method further includes steps of: applying the network selection configuration by the user terminal in a case in which the user terminal allows the network selection configuration; transmitting, in a case in which the user terminal does not allow the network selection configuration, a notification indicating that the network selection configuration is not allowed, from the user terminal to the cellular RAN; and receiving, by the user terminal, a network selection configuration newly transmitted from the cellular RAN in response to the notification.

In the first to third embodiments, the communication control method further includes steps of: transmitting, in a case in which the network selection parameter included in the network selection configuration is insufficient, information indicating missing network selection parameter, from the user terminal to the cellular RAN; and receiving the missing network selection parameter from the cellular RAN by the user terminal.

In the second and third embodiments, the user terminal receives the network selection configuration transmitted from the cellular RAN in response to a predetermined trigger. The predetermined trigger is overload of the cellular RAN or frequent occurrence of traffic switching between the cellular RAN and the wireless LAN.

In the second and third embodiments, the plurality of network selection schemes includes a first scheme in which the user terminal has a decision right of an access network in which traffic of the user terminal is to be accommodated, and a second scheme in which the cellular RAN has the decision right. The network selection configuration transmitted from the cellular RAN in response to the predetermined trigger includes information for specifying the second scheme.

In the second and third embodiments, the plurality of network selection schemes includes a first scheme in which a selection rule of an access network in which traffic of the user terminal is to be accommodated is provided only from an ANDSF server, and a second scheme in which the selection rule can be provided from the cellular RAN. The network selection configuration transmitted from the cellular RAN in response to the predetermined trigger includes information for specifying the second scheme.

In an operation pattern 1 of the third embodiment, the communication control method further includes steps of: receiving, from the cellular RAN by the user terminal, a threshold value related to the number of traffic switchings performed between the cellular RAN and the wireless LAN; and transmitting, in response to the number of switchings in the user terminal exceeding the threshold value, a notification indicating the exceedance, from the user terminal to the cellular RAN.

In an operation pattern 2 of the third embodiment, the communication control method further includes steps of: receiving, from the cellular RAN by the user terminal, a wireless LAN report request when the user terminal releases connection with the cellular RAN; and transmitting, by the user terminal to the cellular RAN, a wireless LAN report related to a wireless LAN to which the user terminal has lastly connected, based on the wireless LAN report request, when connecting with the cellular RAN next time.

In the first to third embodiments, the communication control method further includes a step of receiving, from the cellular RAN by a core network, information indicating the network selection scheme decided by the cellular RAN from among the plurality of network selection schemes.

A user terminal according to first to third embodiments exists in a cell included in a cellular RAN in a communication system capable of using a plurality of network selection schemes for selecting, from the cellular RAN and a wireless LAN, an access network in which traffic of the user terminal is to be accommodated. The user terminal includes a receiver configured to receive, from the cellular RAN, a network selection configuration related to a network selection scheme decided by the cellular RAN from among the plurality of network selection schemes.

First Embodiment

An embodiment of a case in which a cellular communication system (an LTE system) formed in compliance with the 3GPP standards is linked with a wireless LAN (WLAN) system will be described below with reference to the drawings.

(System Configuration)

Figure 1:
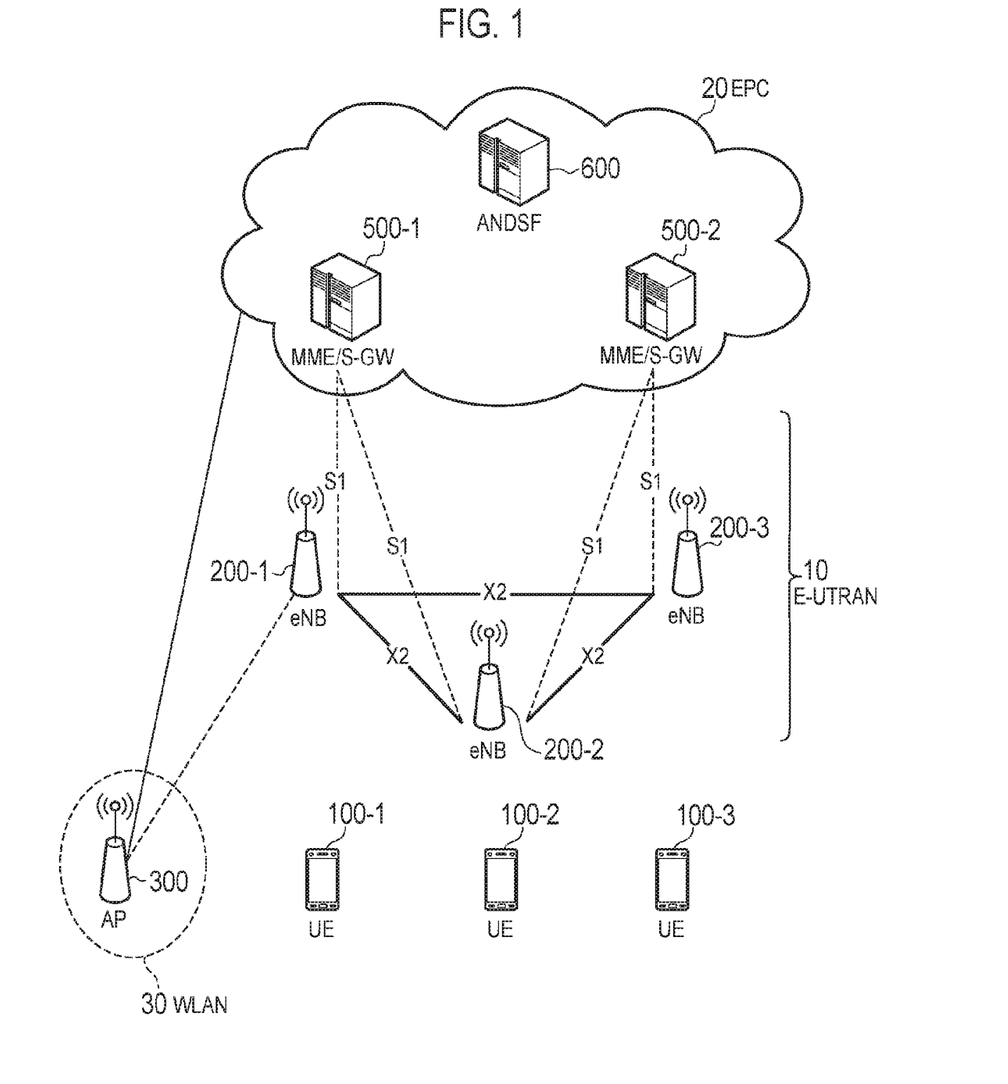
FIG. 1 is a system configuration diagram according to first to third embodiments.

FIG. 1 is a system configuration diagram according to the first embodiment. As illustrated in FIG. 1, a cellular communication system includes a plurality of user equipments (UEs) 100, an Evolved-UMTS Terrestrial Radio Access Network (E-UTRAN) 10, and an Evolved Packet Core (EPC) 20.

The E-UTRAN 10 corresponds to a cellular RAN. The EPC 20 corresponds to a core network. The E-UTRAN 10 and the EPC 20 construct a network of the cellular communication system.

The UE 100 is a mobile radio communication apparatus, and performs radio communication with a cell with which connection has been established. The UE 100 corresponds to a user terminal. The UE 100 is a terminal supporting both communication schemes of a cellular communication scheme and a WLAN communication scheme (dual terminal).

The E-UTRAN 10 includes a plurality of evolved Node-Bs (eNBs) 200. The eNB 200 corresponds to a cellular base station. The eNB 200 manages one or a plurality of cells, and performs radio communication with the UE 100 that has established connection with an own cell. In addition, a "cell" is used as a term indicating a minimum unit of a radio communication area, and is also used as a term indicating a function of performing radio communication with the UE 100. Further, the eNB 200 has, for example, a radio resource management (RRM) function, a user data routing function, and a measurement control function for mobility control and scheduling.

The eNBs 200 are connected to one another via an X2 interface. In addition, the eNB 200 is connected via an S1 interface to a Mobility Management Entity (MME)/Serving-Gateway (S-GW) 500 included in the EPC 20.

The EPC 20 includes a plurality of MMEs/S-GWs 500. The MME is a network node for performing, for example, various types of mobility control for the UE 100, and corresponds to a control station. The S-GW is a network node for performing transfer control of user data, and corresponds to an exchange station.

A WLAN 30 includes a WLAN access point (hereinafter, briefly referred to as "AP") 300. The AP 300 is an AP (operator-controlled AP) managed by an operator of a cellular communication system, for example.

The WLAN 30 is constructed in compliance with various standards of the Institute of Electrical and Electronics Engineers (IEEE) 802.11, for example. The AP 300 communicates with the UE 100 in a frequency band (WLAN frequency band) different from a cellular frequency band. The AP 300 is connected to the EPC 20 via a router, etc.

In addition, the configuration is not limited to a case in which the eNB 200 and the AP 300 are separately arranged. The eNB 200 and the AP 300 may be arranged in the same location (collocated). As one mode of the collocation, the eNB 200 and the AP 300 may be directly connected to each other via an arbitrary interface of an operator.

The EPC 20 further includes an access network discovery and selection function (ANDSF) server 600. The ANDSF server 600 manages ANDSF information related to the WLAN 30. The ANDSF server 600 provides the UE 100 with the ANDSF information related to the WLAN 30, using a non access stratum (NAS) message.

In addition, the ANDSF server 600 used by the UE 100 in a Home Public Land Mobile Network (H-PLMN) is referred to as an H-ANDSF server. The ANDSF server 600 used by the UE 100 in a Visited Public Land Mobile Network (V-PLMN) during roaming is referred to as a V-ANDSF server.

Next, the configurations of the UE 100, the eNB 200, and the AP 300 will be described.

Figure 2:
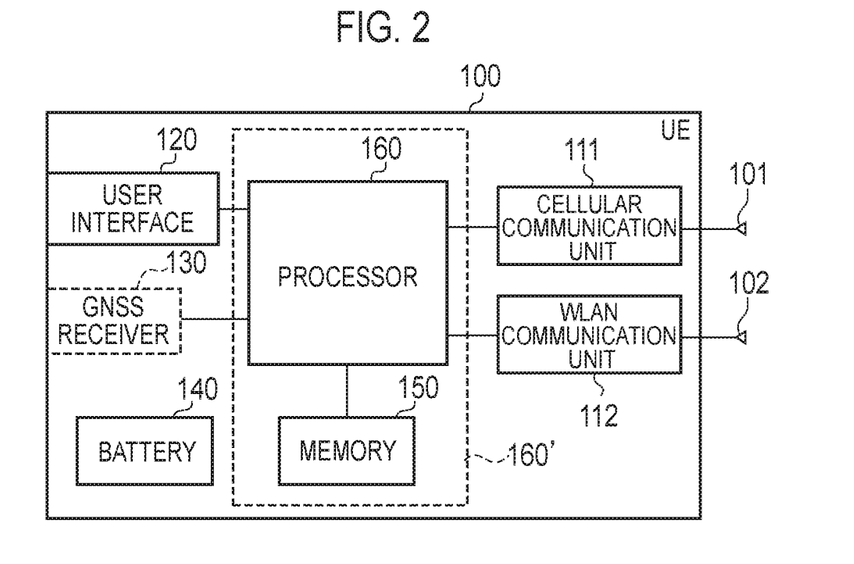
FIG. 2 is a block diagram of a user equipment (UE) according to the first to third embodiments.

FIG. 2 is a block diagram of the UE 100. As illustrated in FIG. 2, the UE 100 includes antennas 101 and 102, a cellular communication unit 111, a WLAN communication unit 112, a user interface 120, a Global Navigation Satellite System (GNSS) receiver 130, a battery 140, a memory 150, and a processor 160. The memory 150 and the processor 160 constitute a controller. The UE 100 may not include the GNSS receiver 130. In addition, the memory 150 may be integrally formed with the processor 160, and this set (i.e., a chipset) may be regarded as a processor 160'.

The antenna 101 and the cellular communication unit 111 are used for the transmission and reception of a cellular radio signal. The cellular communication unit 111 converts a baseband signal output from the processor 160, into a cellular radio signal, and transmits the cellular radio signal from the antenna 101. In addition, the cellular communication unit 111 converts a cellular radio signal received by the antenna 101, into a baseband signal, and outputs the baseband signal to the processor 160.

The antenna 102 and the WLAN communication unit 112 are used for the transmission and reception of a WLAN radio signal. The WLAN communication unit 112 converts a baseband signal output from the processor 160, into a WLAN radio signal, and transmits the WLAN radio signal from the antenna 102. In addition, the WLAN communication unit 112 converts a WLAN radio signal received by the antenna 102, into a baseband signal, and outputs the baseband signal to the processor 160.

The user interface 120 is an interface with a user carrying the UE 100, and includes, for example, a display, a microphone, a loudspeaker, and various buttons. Upon receiving input from the user, the user interface 120 outputs a signal indicating the content of the input, to the processor 160. The GNSS receiver 130 receives a GNSS signal to obtain position information indicating a geographical position of the UE 100, and outputs the received signal to the processor 160. The battery 140 accumulates power to be supplied to each block of the UE 100.

The memory 150 stores programs to be executed by the processor 160, and information to be used for a process performed by the processor 160. The processor 160 includes a baseband processor that performs modulation and demodulation, encoding and decoding, and the like of a baseband signal, and a central processing unit (CPU) that performs various processes by executing the programs stored in the memory 150. The processor 160 may further include a codec that performs encoding and decoding of sound and video signals. The processor 160 executes various processes and various communication protocols that are to be described later.

Figure 3:
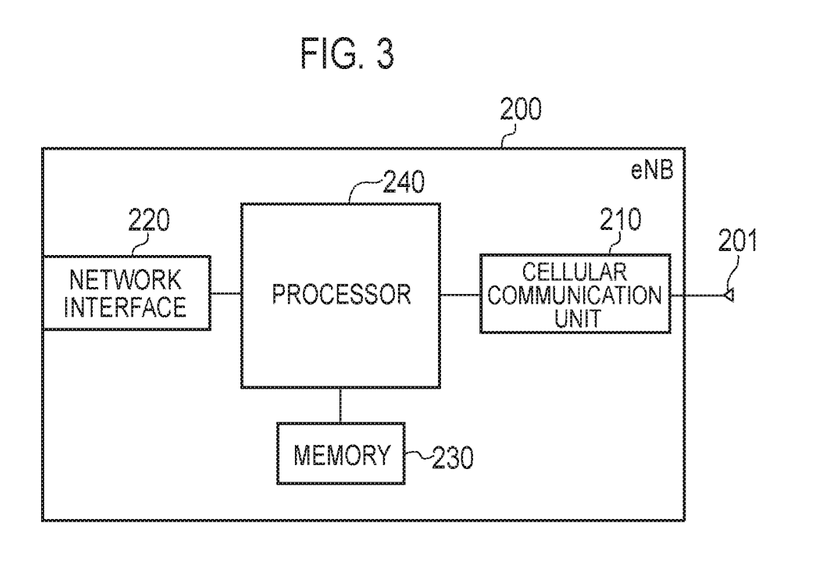
FIG. 3 is a block diagram of an evolved Node-B (eNB) according to the first to third embodiments.

FIG. 3 is a block diagram of the eNB 200. As illustrated in FIG. 3, the eNB 200 includes an antenna 201, a cellular communication unit 210, a network interface 220, a memory 230, and a processor 240. The memory 230 and the processor 240 constitute a controller.

The antenna 201 and the cellular communication unit 210 are used for the transmission and reception of a cellular radio signal. The cellular communication unit 210 converts a baseband signal output from the processor 240, into a cellular radio signal, and transmits the cellular radio signal from the antenna 201. In addition, the cellular communication unit 210 converts a cellular radio signal received by the antenna 201, into a baseband signal, and outputs the baseband signal to the processor 240.

The network interface 220 is connected with the neighboring eNB 200 via an X2 interface, and is connected with the MME/S-GW 500 via an S1 interface. In addition, the network interface 220 is used for communication with the AP 300 via the EPC 20.

The memory 230 stores programs to be executed by the processor 240, and information to be used for a process performed by the processor 240. The processor 240 includes a baseband processor that performs modulation and demodulation, encoding and decoding, and the like of a baseband signal, and a CPU that performs various processes by executing the programs stored in the memory 230. The processor 240 executes various processes and various communication protocols that are to be described later.

Figure 4:
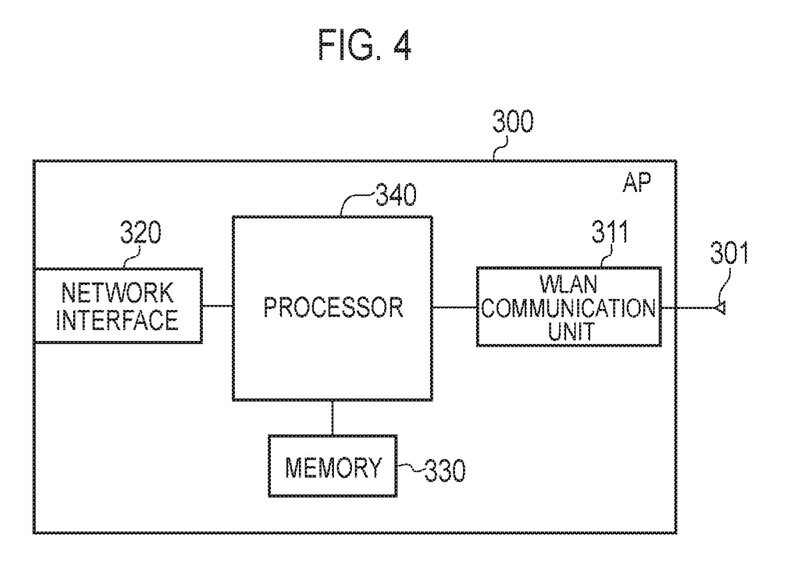
FIG. 4 is a block diagram of an access point (AP) according to the first to third embodiments.

FIG. 4 is a block diagram of the AP 300. As illustrated in FIG. 4, the AP 300 includes an antenna 301, a WLAN communication unit 311, a network interface 320, a memory 330, and a processor 340.

The antenna 301 and the WLAN communication unit 311 are used for the transmission and reception of a WLAN radio signal. The WLAN communication unit 311 converts a baseband signal output from the processor 340, into a WLAN radio signal, and transmits the WLAN radio signal from the antenna 301. In addition, the WLAN communication unit 311 converts a WLAN radio signal received by the antenna 301, into a baseband signal, and outputs the baseband signal to the processor 340.

The network interface 320 is connected with the EPC 20 via a router, etc. In addition, the network interface 320 is used for communication with the eNB 200 via the EPC 20.

The memory 330 stores programs to be executed by the processor 340, and information to be used for a process performed by the processor 340. The processor 340 includes a baseband processor that performs modulation and demodulation, encoding and decoding, and the like of a baseband signal, and a CPU that performs various processes by executing the programs stored in the memory 330.

Figure 5:
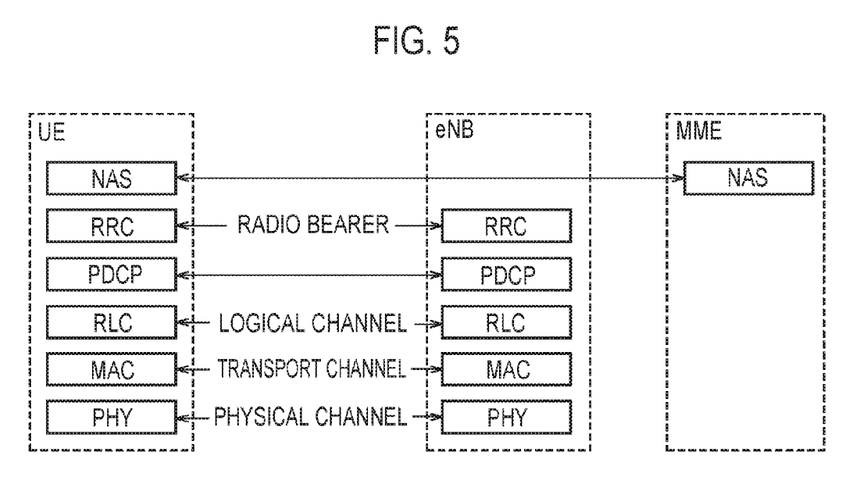
FIG. 5 is a protocol stack diagram of a radio interface in a Long Term Evolution (LTE) system.

FIG. 5 is a protocol stack diagram of a radio interface in the cellular communication system. As illustrated in FIG. 5, a radio interface protocol is separated into layers 1 to 3 of an Open Systems Interconnection (OSI) reference model. The layer 1 is a physical (PHY) layer. The layer 2 includes a medium access control (MAC) layer, a radio link control (RLC) layer, and a packet data convergence protocol (PDCP) layer. The layer 3 includes a radio resource control (RRC) layer.

The PHY layer performs encoding and decoding, modulation and demodulation, antenna mapping and demapping, and resource mapping and demapping. Between the PHY layer of the UE 100 and the PHY layer of the eNB 200, data is transmitted via a physical channel.

The MAC layer performs data priority control, a retransmission process using a hybrid automatic repeat request (ARQ) (HARQ), and the like. Between the MAC layer of the UE 100 and the MAC layer of the eNB 200, data is transmitted via a transport channel. The MAC layer of the eNB 200 includes a scheduler for selecting a transport format (transport block size, modulation and coding schemes, and the like) of an uplink and a downlink, and an allocated resource block.

The RLC layer transmits data to an RLC layer on a reception side using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane. Between the RRC layer of the UE 100 and the RRC layer of the eNB 200, a control message (an RRC message) for various settings is transmitted. The RRC layer controls the logical channel, the transport channel, and the physical channel in response to establishment, re-establishment, and release of a radio bearer. If there is connection (RRC connection) between the RRC of the UE 100 and the RRC of the eNB 200, the UE 100 is in a cellular communication connected state (an RRC connected state). If not, the UE 100 is in a cellular communication idle state (an RRC idle state).

A non-access stratum (NAS) layer positioned above the RRC layer performs session management, mobility management, and the like. An MME 300 and the ANDSF server 600 transmit and receive a NAS message to and from the UE 100.

(Operation According to First Embodiment)

An operation according to the first embodiment will be described below.

(1) Operation Overview

Figure 6:
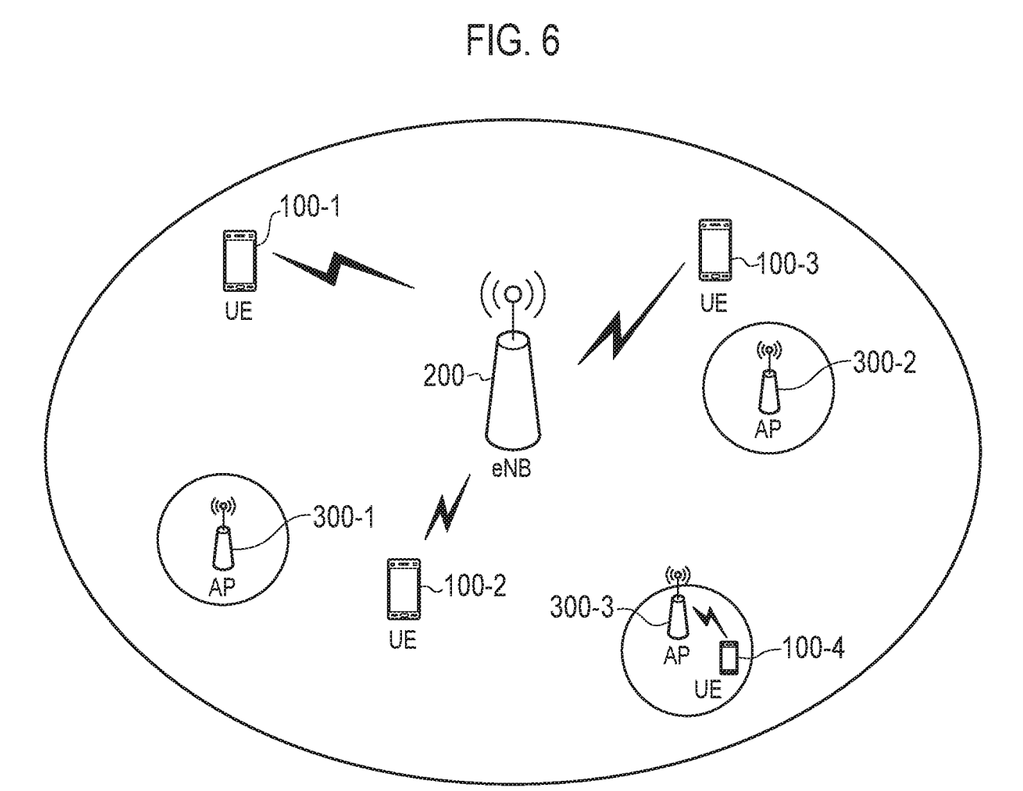
FIG. 6 is a diagram for illustrating an operation environment according to the first to third embodiments.

FIG. 6 is a diagram for illustrating an operation environment according to the first embodiment. As illustrated in FIG. 6, a plurality of APs 300 is provided in the coverage of the cell of the eNB 200. In addition, a plurality of UEs 100 exists in the coverage of the cell of the eNB 200. The UE 100 has established connection with the eNB 200, and performs cellular communication with the eNB 200. Specifically, the UE 100 transmits and receives a cellular radio signal including traffic (user data) to and from the eNB 200.

In such an operation environment, by performing traffic steering of switching a network so that the traffic of the UE 100 that is accommodated in the eNB 200 (E-UTRAN 10) is accommodated in the AP 300 (WLAN 30), traffic load on the eNB 200 can be reduced (offload). The traffic steering includes a case in which a connection destination of the UE 100 is switched between the eNB 200 and the AP 300, and a case in which a data path (bearer) is switched between the eNB 200 and the AP 300 while the UE 100 is connected to both the eNB 200 and the AP 300.

In addition, as a network selection scheme for selecting, from the E-UTRAN 10 and the WLAN 30, an access network in which the traffic of the UE 100 is to be accommodated (hereinafter, referred to as an "accommodation network"), a plurality of network selection schemes exists.

The plurality of network selection schemes is different from one another in an apparatus that decides an accommodation network. For example, the plurality of network selection schemes includes a scheme in which the UE 100 has a decision right of an accommodation network, and a scheme in which the E-UTRAN 10 has a decision right of an accommodation network.

Alternatively, the plurality of network selection schemes is different from one another in an apparatus that provides a selection rule of an accommodation network. For example, the plurality of network selection schemes includes a scheme in which a selection rule of an accommodation network is provided only from the ANDSF server 600, and a scheme in which a selection rule of an accommodation network can be provided from the E-UTRAN 10.

Among the network selection schemes, the first embodiment mainly deals with a network selection scheme in which the E-UTRAN 10 is involved (hereinafter, referred to as a "RAN Solution").

RAN Solution 1 is a scheme in which a selection rule of an accommodation network is provided only from the ANDSF server 600, and the UE 100 has a decision right of an accommodation network. The E-UTRAN 10 provides the UE 100 with auxiliary information (network selection parameter, etc.).

RAN Solution 2 is a scheme in which a selection rule of an accommodation network can be provided from the E-UTRAN 10, and the UE 100 has a decision right of an accommodation network. In addition, a selection rule of an accommodation network can also be provided from the ANDSF server 600.

Unlike RAN Solutions 1 and 2, RAN Solution 3 is a scheme in which the E-UTRAN 10 has a decision right of an accommodation network. In RAN Solution 3, the E-UTRAN 10 decides an accommodation network using a similar procedure to a handover procedure of an LTE system.

In the first embodiment, various RAN Solutions as described above can be appropriately used according to each case. A communication control method according to the first embodiment includes the step of receiving, from the E-UTRAN 10 by the UE 100 existing in a cell included in the E-UTRAN 10, a network selection configuration (Configuration) related to a RAN Solution decided by the E-UTRAN 10 from among a plurality of RAN Solutions.

In this manner, in the first embodiment, the E-UTRAN 10 decides the RAN Solution, and the decided RAN Solution is set in the UE 100 from the E-UTRAN 10. With this configuration, an optimum RAN Solution according to the status of the E-UTRAN 10 can be set. The E-UTRAN 10 may decide a RAN Solution for each cell, or may decide a RAN Solution for each UE 100. With this configuration, an optimum RAN Solution can be applied for each cell or for each UE 100.

In the first embodiment, the network selection configuration includes information (RAN Solution number) for specifying the RAN Solution decided by the E-UTRAN 10, and network selection parameter corresponding to the RAN Solution decided by the E-UTRAN 10. The network selection parameter refers to a parameter (threshold value or variable number) applied to a network selection rule corresponding to the RAN Solution number. With this configuration, network selection parameter appropriate for each RAN Solution can be set in the UE 100.

An example of a relationship between the network selection rule and network selection parameters is indicated as follows: "cellular measurement value<A & WLAN measurement value>B", where a rule of performing the traffic steering from the E-UTRAN 10 to the WLAN 30 corresponds to the network selection rule, and "A" and "B" correspond to the network selection parameters.

In addition, the communication control method according to the first embodiment further includes the steps of applying the network selection configuration by the UE 100 in a case in which the UE 100 allows the network selection configuration, transmitting, in a case in which the UE 100 does not allow the network selection configuration, a notification indicating that the network selection configuration is not allowed, from the UE 100 to the E-UTRAN 10, and receiving, by the UE 100, a network selection configuration newly transmitted from the E-UTRAN 10 in response to the notification. With this configuration, an appropriate network selection configuration (RAN Solution number, network selection parameter) can be set in the UE 100 in consideration of the state of the UE 100.

The communication control method according to the first embodiment further includes the steps of transmitting, in a case in which the network selection parameter included in the network selection configuration is insufficient, information indicating a missing network selection parameter, from the UE 100 to the E-UTRAN 10, and receiving the missing network selection parameter from the E-UTRAN 10 by the UE 100. With this configuration, sufficient network selection parameters can be set in the UE 100.

(2) Operation Specific Example

Figure 7:
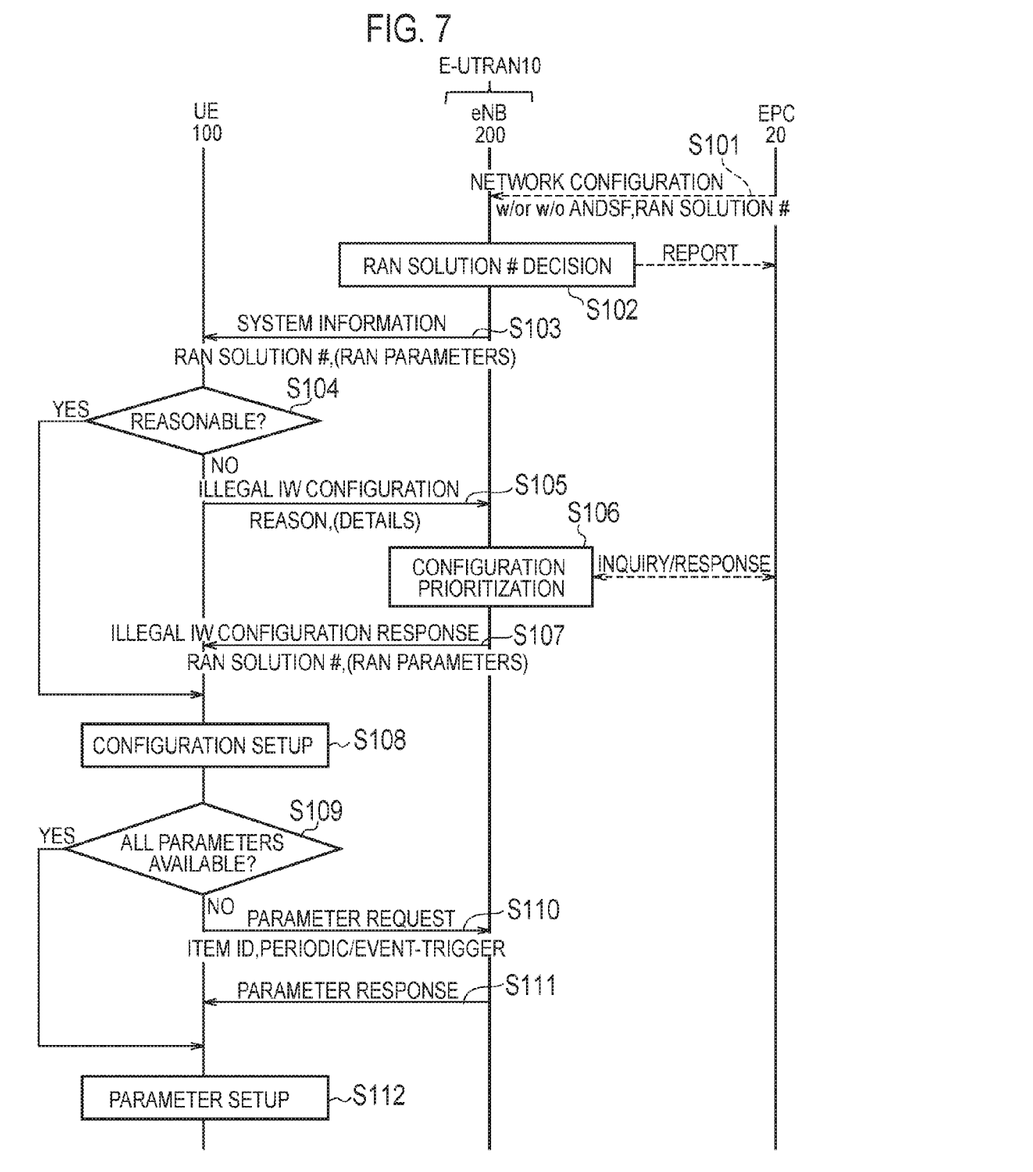
FIG. 7 is an operation sequence diagram according to the first embodiment.

FIG. 7 is an operation sequence diagram according to the first embodiment.

As illustrated in FIG. 7, in step S101, the EPC 20 notifies the eNB 200 of network configuration information related to the EPC 20. The network configuration information includes the presence or absence and state of the ANDSF server 600 in the EPC 20. The network configuration information may include an operator policy.

In step S102, the eNB 200 decides a RAN Solution number to be applied in the own cell, based on the network configuration information related to the EPC 20. Specifically, the eNB 200 determines whether the ANDSF server 600 exists, whether a network selection rule provided by the ANDSF server 600 has passed its expiration date, and the like. For example, when the ANDSF server 600 does not exist, or when a network selection rule provided by the ANDSF server 600 has passed its expiration date, the eNB 200 decides RAN Solution 2 or 3. The eNB 200 may notify the EPC 20 of the decided RAN Solution number.

In step S103, the eNB 200 reports (broadcasts) a network selection configuration including the RAN Solution number to be applied in the own cell, using system information. Alternatively, the eNB 200 may individually notify the UE 100 of the network selection configuration through RRC signaling (e.g., RRC Connection Reconfiguration).

In addition to the RAN Solution number, the network selection configuration may include network selection parameter corresponding to the RAN Solution number. The UE 100 receives the network selection configuration.

The network selection configuration may include information about priority related to the ANDSF server 600 (hereinafter, referred to as "ANDSF priority"). Examples of the information about ANDSF priority include information indicating which rule of a network selection rule of the ANDSF server 600 and a network selection rule of the eNB 200 (E-UTRAN 10) priority is to be given to, and information indicating which of an H-ANDSF server and a V-ANDSF server priority is to be given to.

In step S104, the UE 100 compares the network selection configuration received from the eNB 200, with a previously-set or currently-set network selection configuration, and determines whether to allow the network selection configuration received from the eNB 200. When the configurations are inconsistent with each other, for example, when a UE 100 during roaming already has a network selection configuration from an H-ANDSF server, and RAN Solution 1 is specified, the UE 100 determines to refuse the network selection configuration received from the eNB 200. Alternatively, in the case of a contract under which a V-ANDSF server cannot be used, and when RAN Solution 1 (or 2) is specified, the UE 100 during roaming may determine to refuse the network selection configuration received from the eNB 200.

When the UE 100 determines to refuse the network selection configuration received from the eNB 200, in step S105, the UE 100 transmits, to the eNB 200, a refusal notification (an RRC message) indicating that the network selection configuration received from the eNB 200 is refused. The refusal notification may include information indicating the reason for refusal.

In step S106, the eNB 200 that has received the refusal notification decides again a RAN Solution to be applied, based on the reason for refusal, the roaming status of the UE 100, and the like. For example, a UE 100 during roaming decides RAN Solution 1 according to the H-ANDSF server setting of the UE 100. Alternatively, it may be determined that an originally-decided RAN Solution is forcibly applied, and a response indicating that the refusal notification from the UE 100 is not accepted may be transmitted.

In step S107, the eNB 200 notifies, by unicast, the UE 100 of a new network selection configuration (RRC message) including a RAN Solution number decided again, and a corresponding network selection parameter.

In step S108, the UE 100 starts applying the network selection configuration received from the eNB 200 (RAN Solution number, network selection parameter, ANDSF priority).

In step S109, the UE 100 checks whether there is a missing network selection parameter, based on the applied RAN Solution number (and ANDSF priority). The missing network selection parameter includes network selection parameter requiring update.

When there is a missing network selection parameter, in step S110, the UE 100 transmits a transmission request for the missing network selection parameter, to the eNB 200. The transmission request includes an item (ID) of the missing network selection parameter. In addition, when periodic update is necessary, a notification indicating that periodic update is necessary and an update interval may be transmitted. Alternatively, when update is necessary in response to an event trigger, a notification indicating that update is necessary in response to an event trigger and a trigger condition may be transmitted.

In step S111, the eNB 200 transmits, to the UE 100, a response including the missing network selection parameter, in response to the parameter transmission request from the UE 100.

In step S112, the UE 100 sets the network selection parameter provided from the eNB 200.

Second Embodiment

The second embodiment will be described mainly based on a difference from the first embodiment. A system configuration and an operation environment according to the second embodiment are similar to those according to the first embodiment.

(Operation According to Second Embodiment)
(1) Operation Overview

The UE 100 receives a network selection configuration transmitted from the E-UTRAN 10 in response to a predetermined trigger. In the second embodiment, the predetermined trigger is overload on the E-UTRAN 10.

In the second embodiment, the network selection configuration transmitted from the E-UTRAN 10 in response to a trigger of overload on the E-UTRAN 10 includes information (RAN Solution number) for specifying RAN Solution 3 in which the E-UTRAN 10 has a decision right of an accommodation network. Alternatively, the network selection configuration transmitted from the E-UTRAN 10 in response to a trigger of overload on the E-UTRAN 10 includes information (RAN Solution number) for specifying RAN Solution 2 or 3 in which a selection rule of an accommodation network can be provided from the E-UTRAN 10.

With this configuration, when the E-UTRAN 10 is overloaded, the degree of involvement of the E-UTRAN 10 in network selection can be increased. Thus, the load on the E-UTRAN 10 can be reduced.

(2) Operation Specific Example

Figure 8:
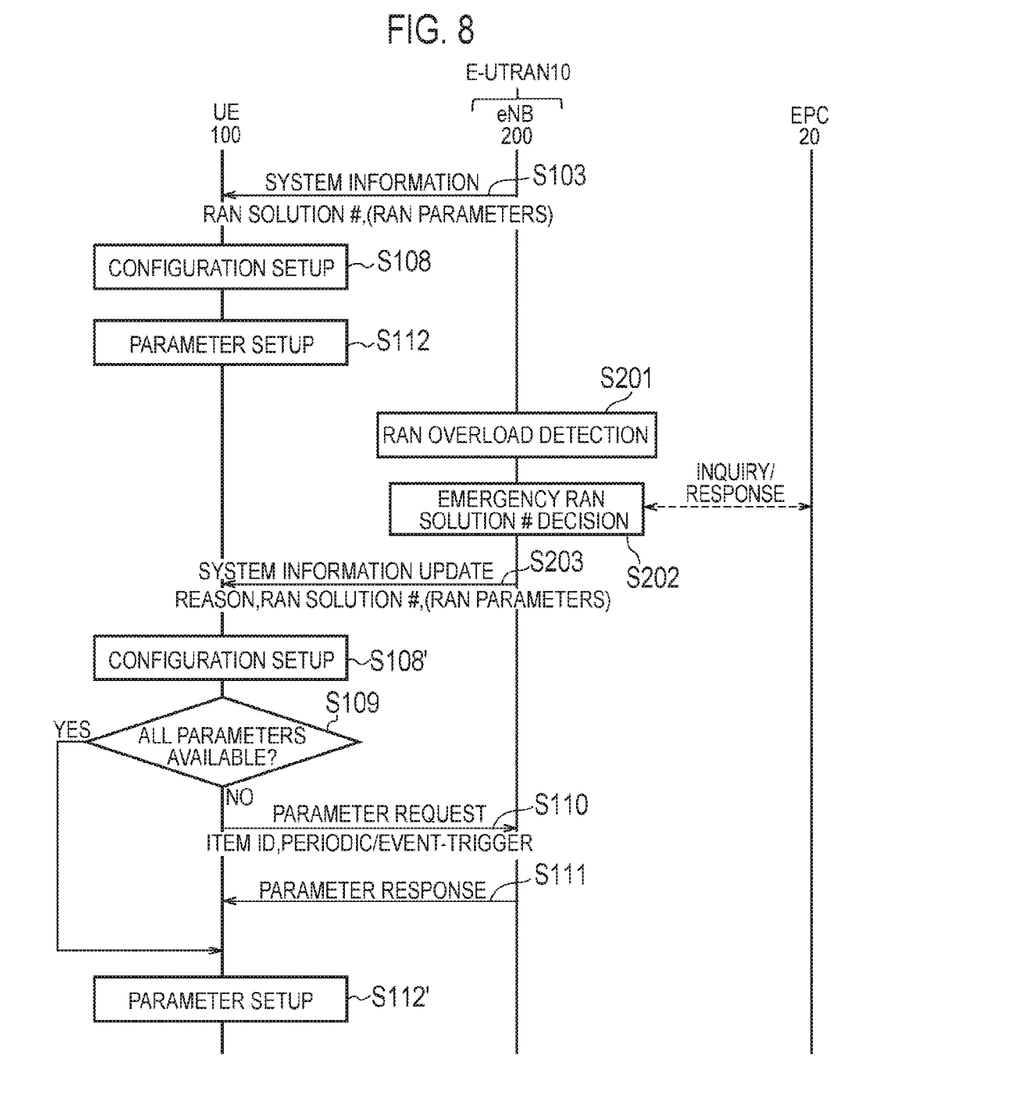
FIG. 8 is an operation sequence diagram according to the second embodiment.

FIG. 8 is an operation sequence diagram according to the second embodiment.

As illustrated in FIG. 8, in step S103, the eNB 200 reports a network selection configuration including a RAN Solution number to be applied in the own cell (and network selection parameter, ANDSF priority), using system information.

In step S108, the UE 100 starts applying the network selection configuration received from the eNB 200 (RAN Solution number, network selection parameter, ANDSF priority).

In step S112, the UE 100 sets the network selection parameter provided from the eNB 200.

In step S201, the eNB 200 detects an overloaded state of the E-UTRAN 10 (alternatively, the own cell or the eNB 200 itself).

In step S202, the eNB 200 decides an emergency (a temporary) RAN Solution for reducing the load on the E-UTRAN 10. In addition, the eNB 200 may decide an emergency (a temporary) network selection parameter corresponding to the RAN Solution. In such a decision process, reporting and inquiry to the EPC 20 may be performed.

In step S203, the eNB 200 reports a network selection configuration including the RAN Solution and the network selection parameter that have been decided in step S202. Alternatively, the eNB 200 may individually notify the UE 100 using an RRC message. The emergency (temporary) network selection configuration may include information indicating the reason for emergency (temporariness). For example, the network selection configuration includes information indicating that the E-UTRAN is overloaded. In this case, the UE 100 is forced to apply the network selection configuration.

In step S108', the UE 100 starts applying the network selection configuration received from the eNB 200 (RAN Solution number, network selection parameter, ANDSF priority).

In step S109, the UE 100 checks whether there is a missing network selection parameter, based on the applied RAN Solution number (and ANDSF priority).

When there is a missing network selection parameter, in step S110, the UE 100 transmits a transmission request for the missing network selection parameter, to the eNB 200.

In step S111, the eNB 200 transmits, to the UE 100, a response including the missing network selection parameter, in response to the parameter transmission request from the UE 100.

In step S112', the UE 100 sets the network selection parameter provided from the eNB 200.

Third Embodiment

The third embodiment will be described mainly based on a difference from the first and second embodiments. A system configuration and an operation environment according to the third embodiment are similar to those according to the first embodiment.

(Operation According to Third Embodiment)

(1) Operation Overview

The UE 100 receives a network selection configuration transmitted from the E-UTRAN 10 in response to a predetermined trigger. In the third embodiment, the predetermined trigger is frequent occurrence of traffic switching between the E-UTRAN 10 and the WLAN 30. Hereinafter, an operation of performing traffic steering of the UE 100 from the WLAN 30 to the E-UTRAN 10 after performing traffic steering of the UE 100 from the EUTRAN 10 to the WLAN 30 will be referred to as "ping-pong steering".

In the third embodiment, the network selection configuration transmitted from the E-UTRAN 10 in response to a trigger of frequent occurrence of ping-pong steering between the E-UTRAN 10 and the WLAN 30 includes information (RAN Solution number) for specifying RAN Solution 3 in which the E-UTRAN 10 has a decision right of an accommodation network. Alternatively, the network selection configuration transmitted from the E-UTRAN 10 in response to a trigger of frequent occurrence of traffic steering between the E-UTRAN 10 and the WLAN 30 includes information (RAN Solution number) for specifying RAN Solution 2 or 3 in which a selection rule of an accommodation network can be provided from the E-UTRAN 10.

With this configuration, when ping-pong steering frequently occurs between the E-UTRAN 10 and the WLAN 30, the degree of involvement of the E-UTRAN 10 in network selection can be increased. Thus, frequent occurrence of ping-pong steering can be avoided.

An operation pattern 1 of the third embodiment includes the steps of receiving, from the E-UTRAN 10 by the UE 100, a threshold value related to the number of ping-pong steerings performed between the E-UTRAN 10 and the WLAN 30, and transmitting, in response to the number of ping-pong steerings in the UE 100 exceeding the threshold value, a notification indicating the exceedance, from the UE 100 to the E-UTRAN 10. With this configuration, the E-UTRAN 10 can detect frequent occurrence of ping-pong steering.

An operation pattern 2 of the third embodiment includes the steps of receiving, from the E-UTRAN 10 by the UE 100, a WLAN report request when the UE 100 releases connection with the E-UTRAN 10, and transmitting, by the UE 100 to the E-UTRAN 10, a WLAN report related to the WLAN 30 to which the UE 100 has lastly connected, based on the WLAN report request, when connecting with the E-UTRAN 10 next time. With this configuration, the E-UTRAN 10 can detect frequent occurrence of ping-pong steering by detecting the UE 100 for which ping-pong steering has been performed.

(2) Operation Specific Example (2.1) Operation Pattern 1

Figure 9:
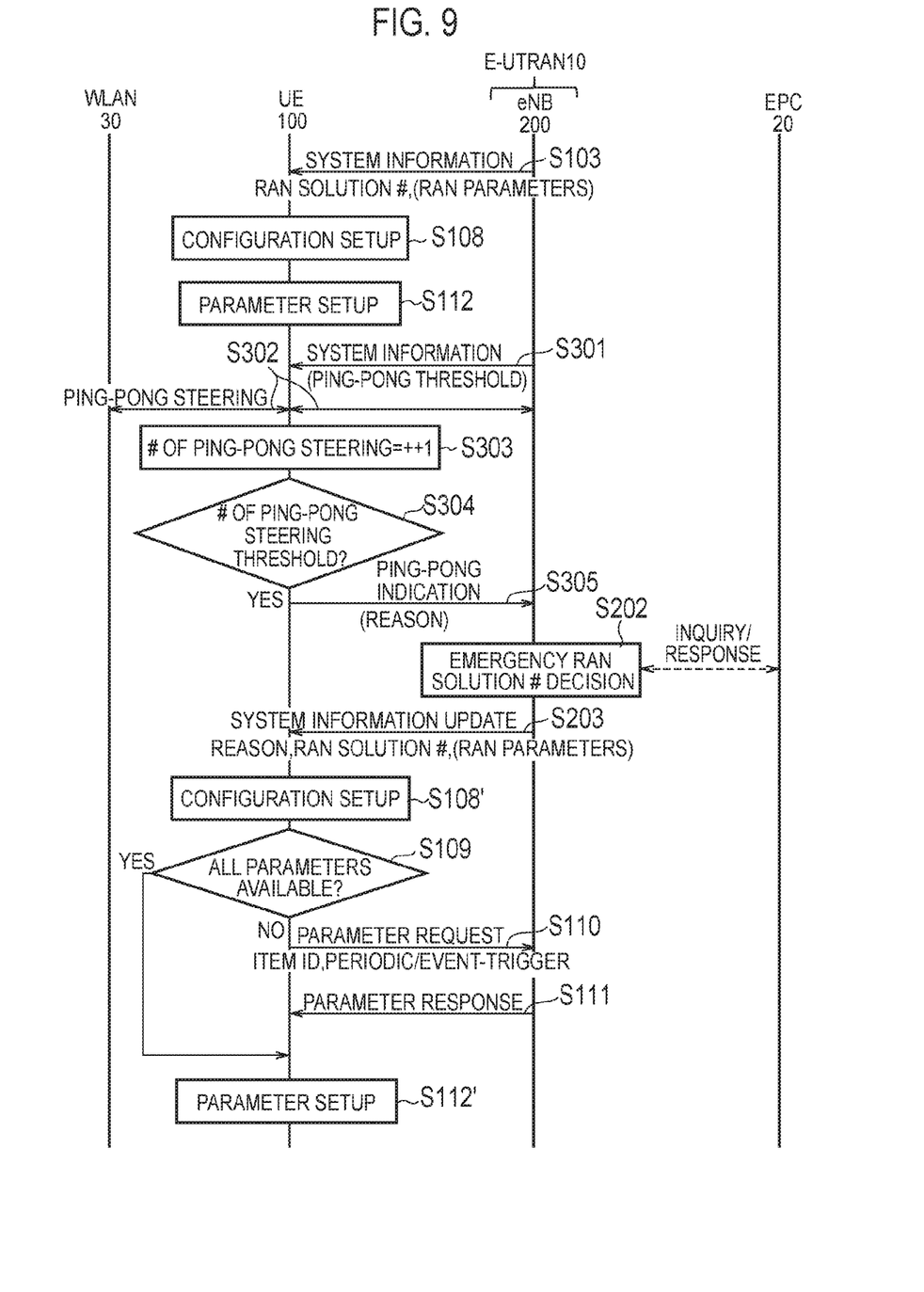
FIG. 9 is an operation sequence diagram according to an operation pattern 1 of the third embodiment.

FIG. 9 is an operation sequence diagram according to the operation pattern 1 of the third embodiment.

As illustrated in FIG. 9, in step S103, the eNB 200 reports a network selection configuration including a RAN Solution number to be applied in the own cell (and network selection parameter, ANDSF priority), using system information.

In step S108, the UE 100 starts applying the network selection configuration received from the eNB 200 (RAN Solution number, network selection parameter, ANDSF priority).

In step S112, the UE 100 sets the network selection parameter provided from the eNB 200.

In step S301, the eNB 200 reports a threshold value related to ping-pong steering performed between the E-UTRAN 10 and the WLAN 30, using system information.

Alternatively, the eNB 200 may individually notify the UE 100 using an RRC message. Yet alternatively, the threshold value may be prestored by the UE 100.

In step S302, the UE 100 performs ping-pong steering between the E-UTRAN 10 and the WLAN 30. When ping-pong steering is performed for the first time, the UE 100 activates a timer after resetting the timer.

In step S303, the UE 100 increments the number of ping-pong steerings managed by itself (counter).

When the number of ping-pong steerings managed by the UE 100 exceeds the threshold value within a timer period (step S304: YES), in step S305, the UE 100 transmits a ping-pong steering frequent occurrence notification to the eNB 200. The ping-pong steering frequent occurrence notification may include information indicating the reason for ping-pong steering frequent occurrence (e.g., during high-speed movement, etc.).

In step S202, the eNB 200 decides an emergency (a temporary) RAN Solution for suppressing ping-pong steering. In addition, the eNB 200 may decide an emergency (a temporary) network selection parameter corresponding to the RAN Solution. In such a decision process, reporting and inquiry to the EPC 20 may be performed.

In step S203, the eNB 200 reports a network selection configuration including the RAN Solution and the network selection parameter that have been decided in step S202. Alternatively, the eNB 200 may individually notify the UE 100 using an RRC message. The emergency (temporary) network selection configuration may include information indicating the reason for emergency (temporariness). For example, the network selection configuration includes information indicating that ping-pong steering frequently occurs. In this case, the UE 100 is forced to apply the network selection configuration.

In step S108', the UE 100 starts applying the network selection configuration received from the eNB 200 (RAN Solution number, network selection parameter, ANDSF priority).

In step S109, the UE 100 checks whether there is a missing network selection parameter, based on the applied RAN Solution number (and ANDSF priority).

When there is a missing network selection parameter, in step S110, the UE 100 transmits a transmission request for the missing network selection parameter, to the eNB 200.

In step S111, the eNB 200 transmits, to the UE 100, a response including the missing network selection parameter, in response to the parameter transmission request from the UE 100.

In step S112', the UE 100 sets the network selection parameter provided from the eNB 200.

(2.2) Operation Pattern 2

Figure 10:
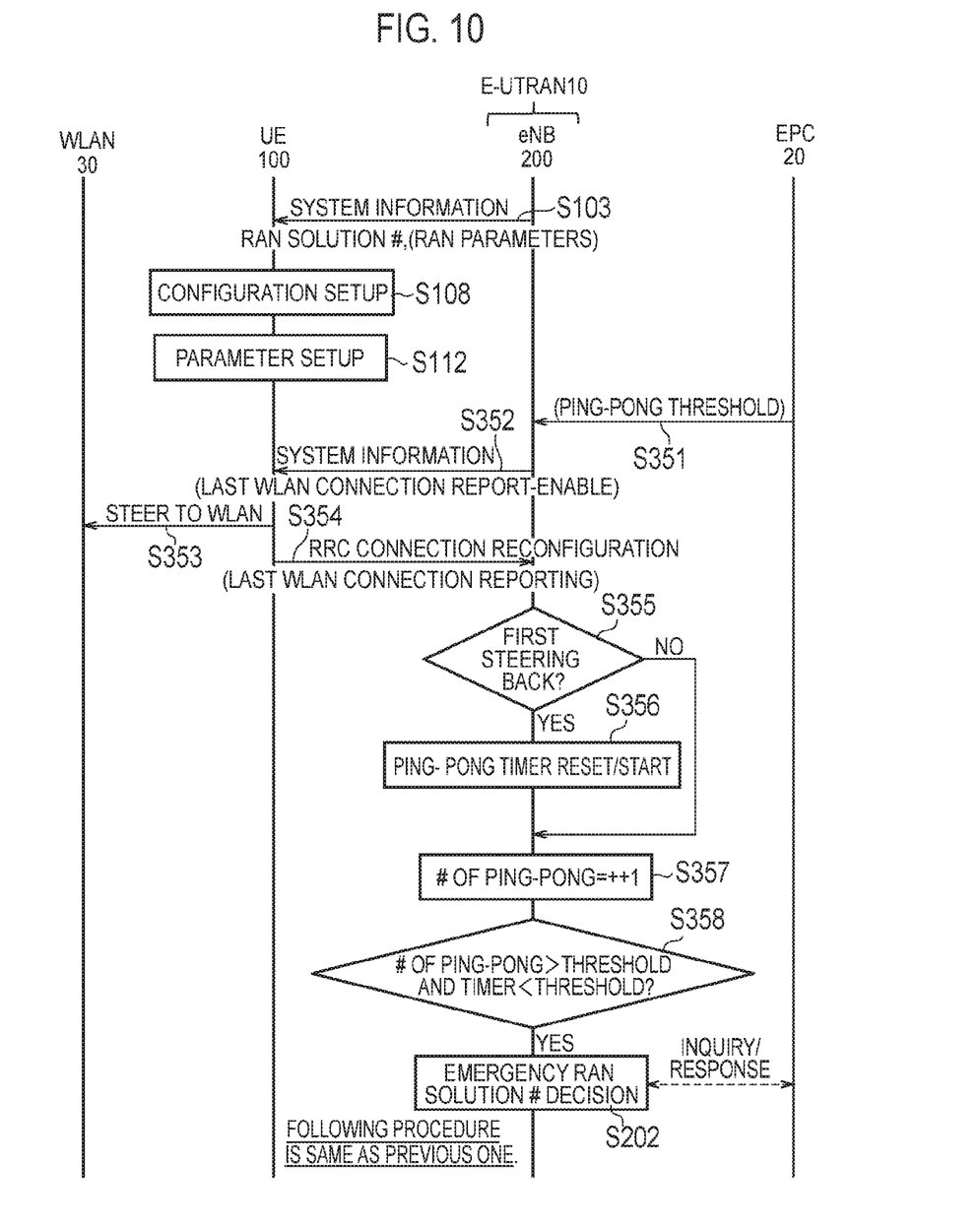
FIG. 10 is an operation sequence diagram according to an operation pattern 2 of the third embodiment.

FIG. 10 is an operation sequence diagram according to the operation pattern 2 of the third embodiment.

As illustrated in FIG. 10, in step S103, the eNB 200 reports a network selection configuration including a RAN Solution number to be applied in the own cell (and network selection parameter, ANDSF priority), using system information.

In step S108, the UE 100 starts applying the network selection configuration received from the eNB 200 (RAN Solution number, network selection parameter, ANDSF priority).

In step S112, the UE 100 sets the network selection parameter provided from the eNB 200.

In step S351, the EPC 20 notifies the eNB 200 of a threshold value of the number of ping-pong steerings. The notification may be reporting using system information, or individual notification using an RRC message. In addition, the eNB 200 may be notified not only of the threshold value of the number of ping-pong steerings, but also of a period for which the number of ping-pong steerings is to be counted (timer).

In step S352, the eNB 200 transmits a WLAN report request to the UE 100. The WLAN report request is a request transmitted for requesting a WLAN report (service set identifier (SSID), extended service set identifier (ESSID), etc.) related to the WLAN 30 to which the UE 100 has lastly connected, when connection with the E-UTRAN 10 is established next time. In addition, the WLAN report does not necessarily have to be detailed information about the WLAN 30. For example, the WLAN report may be a flag indicating that the UE 100 is connected to the E-UTRAN 10 through traffic steering from the WLAN 30.

In step S353, the UE 100 performs traffic steering from the eNB 200 (E-UTRAN 10) to the WLAN 30.

In step S354, the UE 100 performs traffic steering (ping-pong steering) from the WLAN 30 to the eNB 200 (E-UTRAN 10). The UE 100 notifies the eNB 200 of a WLAN report related to the WLAN 30 to which the UE 100 has lastly connected, when connecting with the eNB 200.

When ping-pong steering is performed for the first time (step S355: YES), in step S356, the eNB 200 activates a timer after resetting the timer.

In step S357, the eNB 200 increments the number of ping-pong steerings managed by itself (counter). In this step, the number of ping-pong steerings is assumed to be a value individually counted for each UE 100. Alternatively, the number of ping-pong steerings may be a total value of the numbers of ping-pong steerings of a plurality of UEs 100.

In step S358, when the number of ping-pong steerings managed by the eNB 200 exceeds the threshold value within a timer period (step S358: YES), in step S202, the eNB 200 decides an emergency (a temporary) RAN Solution for suppressing ping-pong steering. In addition, the eNB 200 may decide an emergency (a temporary) network selection parameter corresponding to the RAN Solution. Following operations are similar to those in the operation pattern 1 of the third embodiment.

Other Embodiments

When the UE 100 roaming on a network (PLMN1) supporting a function according to each of the above-described embodiments returns to a home network (PLMN2) not supporting the function, the UE 100 may delete a network selection configuration set in the PLMN1, when registering the position in the PLMN2. Thus, the UE 100 stores the set network selection configuration together with information about a corresponding PLMN. In addition, the UE 100 confirms that a PLMN during position registration matches a currently-set (valid) network selection configuration. The confirmation may be constantly performed, or may be performed in response to a predetermined trigger (in PLMN selection, in attachment, in RRC connection, in RRC connection release, etc.).

In addition, the eNB 200 may add information indicating an expiration date, when setting a network selection configuration. In this case, the UE 100 deletes a network selection configuration that has passed the expiration date. Alternatively, the expiration date may be preset in the UE 100.

Furthermore, if an emergency (a temporary) network selection configuration remains when RRC connection is released, the eNB 200 or the UE 100 may delete the network selection configuration.

In each of the above-described embodiments, an LTE system has been described as an example a cellular communication system. The present invention, however, is not limited to the LTE system. The present invention may be applied to a system other than the LTE system. In each of the above-described operation sequences, an operation performed by the eNB 200 (base station) may be performed by another RAN node (e.g., radio network controller (RNC)) in place of the base station.

Japanese Patent Application No. 2013-202768 (filed on Sep. 27, 2013) is incorporated by reference herein in its entirety.

INDUSTRIAL APPLICABILITY

The present invention is useful in a mobile communication field.

The invention claimed is:

1. A communication control method used in a communication system capable of using a plurality of network selection schemes for selecting, from a cellular radio access network (RAN) and a wireless local area network (LAN), an access network in which traffic of a user terminal is to be accommodated, the communication control method comprising:
 a step of receiving, from the cellular RAN by a user terminal existing in a cell included in the cellular RAN, a network selection configuration related to a network selection scheme decided by the cellular RAN from among the plurality of network selection schemes, wherein
 the plurality of network selection schemes includes a first scheme in which the user terminal has a decision right of an access network in which traffic of the user terminal is to be accommodated, and a second scheme in which the cellular RAN has the decision right, and
 the network selection configuration transmitted from the cellular RAN includes information for specifying the second scheme.

2. The communication control method according to claim 1, wherein
 the user terminal receives the network selection configuration transmitted from the cellular RAN in response to a predetermined trigger, and
 the predetermined trigger is overload of the cellular RAN or frequent occurrence of traffic switching between the cellular RAN and the wireless LAN.

3. A user terminal existing in a cell included in a cellular radio access network (RAN) in a communication system capable of using a plurality of network selection schemes for selecting, from the cellular RAN and a wireless local area network (LAN), an access network in which traffic of the user terminal is to be accommodated, the user terminal comprising:
 a receiver configured to receive, from the cellular RAN, a network selection configuration related to a network selection scheme decided by the cellular RAN from among the plurality of network selection schemes, wherein
 the plurality of network selection schemes includes a first scheme in which the user terminal has a decision right of an access network in which traffic of the user terminal is to be accommodated, and a second scheme in which the cellular RAN has the decision right, and
 the network selection configuration transmitted from the cellular RAN includes information for specifying the second scheme.

4. A base station for constructing a cellular radio access network (RAN) in a communication system capable of using a plurality of network selection schemes for selecting, from the cellular RAN and a wireless local area network (LAN), an access network in which traffic of a user terminal is to be accommodated, wherein
 the base station transmits, to a user terminal existing in an own cell, a network selection configuration related to a network selection scheme to be applied in an own cell from among the plurality of network selection schemes, wherein
 the plurality of network selection schemes includes a first scheme in which the user terminal has a decision right of an access network in which traffic of the user terminal is to be accommodated, and a second scheme in which the cellular RAN has the decision right, and
 the network selection configuration transmitted from the cellular RAN includes information for specifying the second scheme.

* * * * *